Nov. 10, 1959  G. J. FABIAN  2,911,854
LOCKABLE DIFFERENTIAL AND SPEED REDUCING DRIVE
Filed Dec. 17, 1956  3 Sheets-Sheet 1
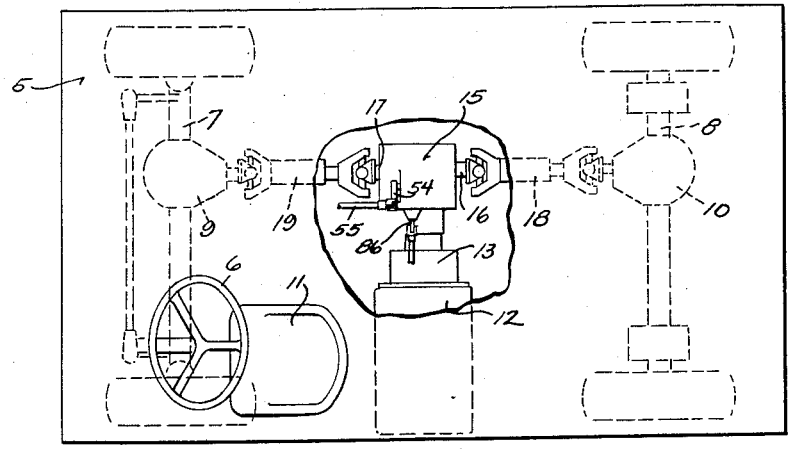
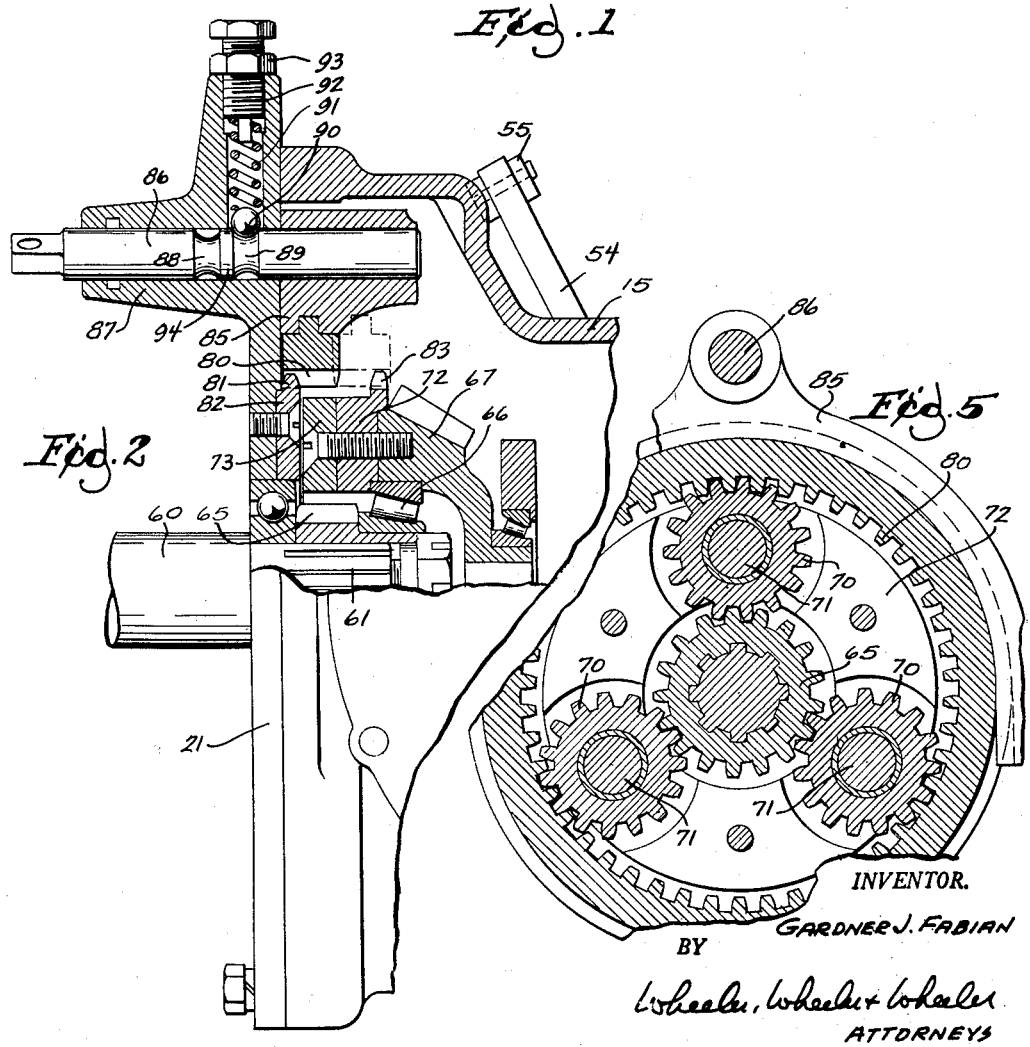
INVENTOR.
GARDNER J. FABIAN
BY
Wheeler, Wheeler & Wheeler
ATTORNEYS

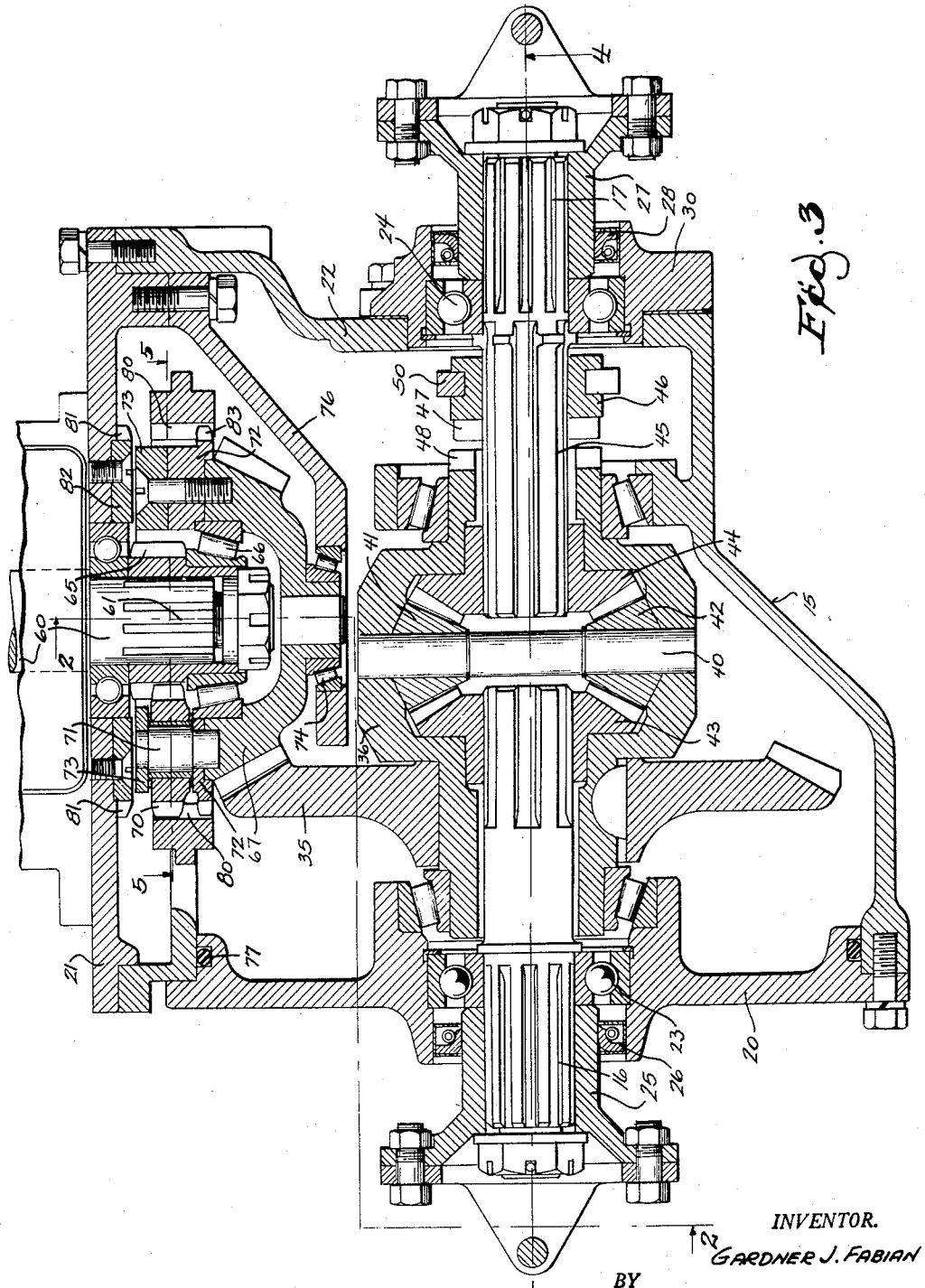

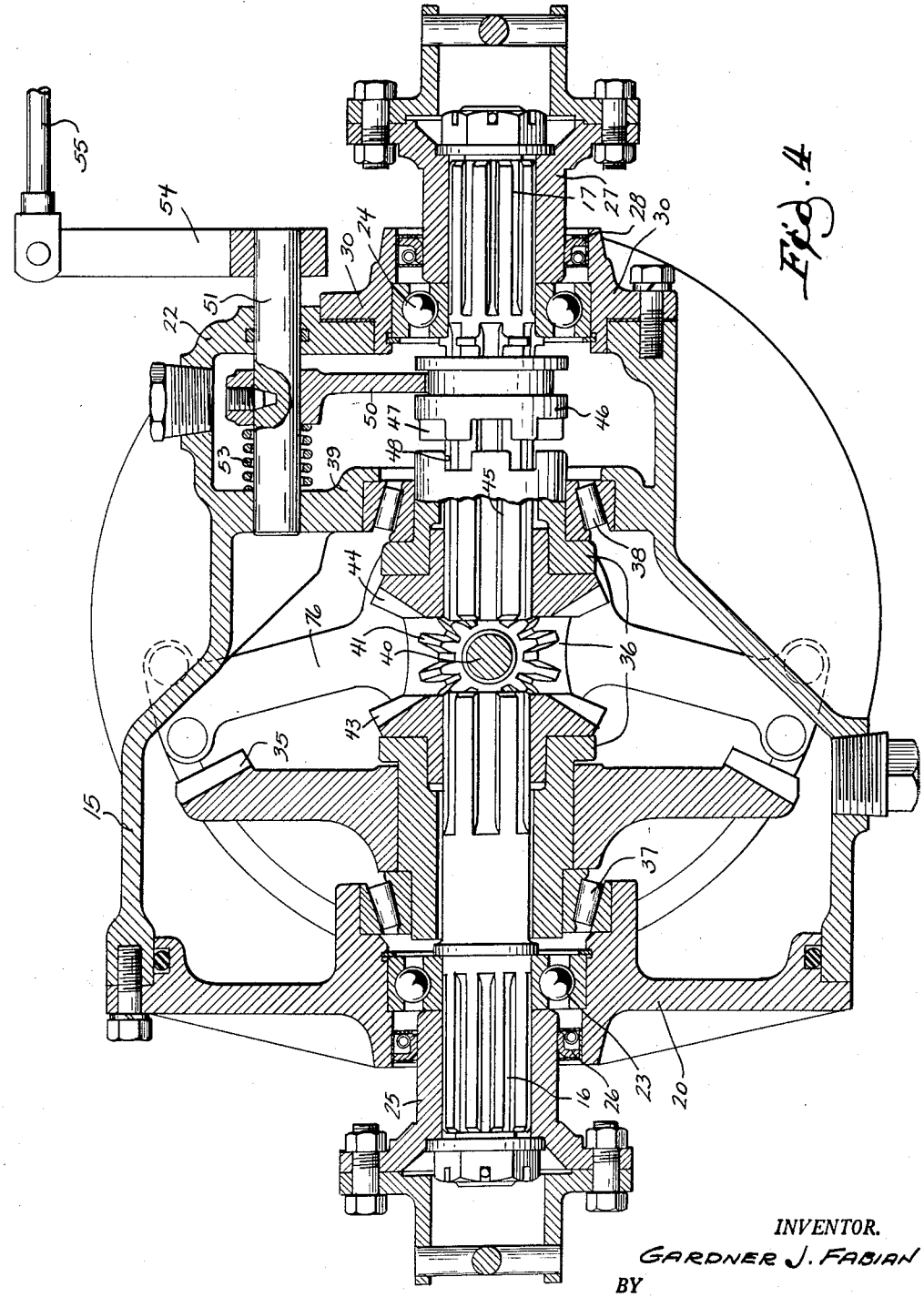

United States Patent Office 2,911,854
Patented Nov. 10, 1959

2,911,854

LOCKABLE DIFFERENTIAL AND SPEED REDUCING DRIVE

Gardner J. Fabian, East Aurora, N.Y., assignor to FWD Corporation, a corporation of Wisconsin Application December 17, 1956, Serial No. 628,904

4 Claims. (Cl. 74—695)

This invention relates to a compactly organized lockable differential and speed reducing drive thereto.

While the invention has utility whereever it is desired to incorporate a ratio-changing drive to a differential, it is of particular importance in the disclosed arrangement in which the differential is the center differential between front and rear axles of a vehicle in which the engine is disposed transversely, thereby greatly limiting the available space. By putting a planetary transmission directly into the differential housing and using the differential ring gear driving pinion as a carrier for the planet gears of the differential, an extremely compact structure results. A shiftable ring gear for the planetary transmission is floated on the planet gears themselves, the ring gear teeth being of sufficient length to permit it to shift between a position of engagement with relatively fixed teeth at one extreme of ring gear movement and a position of engagement with teeth on the planetary pinion carrier at the other extreme of ring gear movement. Notwithstanding the space required for the planetary transmission and its operating connections, I have found it possible to incorporate in the same case a differential lock and connections for actuating it.

In the drawings:

Fig. 1 is a diagrammatic plan view of the ring gear and drive of a motor vehicle, the body and steering wheel being shown in broken lines to indicate their relative locations.

Fig. 2 is a view on a greatly enlarged scale showing the combined transmission and differential on the line indicated at 2—2 in Fig. 3, parts being broken away.

Fig. 3 is a view of the assembly taken in section on the line 3—3 of Fig. 2.

Fig. 4 is a view of the assembly taken in section on the line 4—4 of Fig. 3.

Fig. 5 is a view taken in section on the line 5—5 of Fig. 3.

The purpose of Fig. 1 is solely to facilitate orientation of the parts, a vehicle outline being represented at 5 with the steering wheel shown at 6, the front and rear axles at 7 and 8 respectively, front and rear differential gear casings at 9 and 10, the driver's seat at 11, and the engine at 12. The engine drives through a conventional transmission 13, with which the present invention is not concerned, into the center differential gear housing 15 shown in more detail in the other views. The power output from the center differential drive shafts 16 and 17 passes through the universally jointed line shafts 18 and 19 to the front and rear differential housings 9 and 10 in conventional manner.

The center differential housing 15 comprises removable bearing heads at 20 and 21. In the removable head 20 and the opposite fixed wall 22 of the housing, fore and aft bearings 23 and 24 are provided for the differentially connected driven shafts 16 and 17. The hub 25 of the first universal in the line shaft 18 to the front axle has appropriate packing 26 outside of the bearings 23. Similarly, the hub 27 of the first universal in the rear line shaft 19 has packing at 28 between it and the bearing carrier ring 30, which is detachably connected to the stationary wall 22 of the differential housing and which supports the outer race of bearing 24.

The differential ring gear 35 is keyed to the cage 36 which has its own bearings at 37 and 38 supporting it from head 20 and from the relatively fixed partition web 39 of the housing as best shown in Fig. 3. The cross shaft 40 mounted in the cage 36 supports the planetary pinions 41, 42 which mesh conventionally with gears 43 and 44 splined to the respective driven shafts 16 and 17.

Reciprocable axially on the plines 45 of one of the driven shafts is a clutch member 46 having jaw teeth 47 engageable with complementary teeth 48 formed on the extended end of the cage 36, whereby the locking of the cage to one of the driven shafts will preclude differential action and require the two differential shafts to rotate in unison. A shifting fork 50 is mounted on a rod 51 which is reciprocable through bearings provided in partition web 39 and in the relatively fixed rear wall 22 of the differential case 15. A compression spring 53 biases rod 51 toward the position shown in Fig. 4 in which the clutch teeth are disengaged. An arm 54 has an operating connection at 55, whereby the rod 51 may be actuated against the bias of spring 53 to engage the clutch and lock the differential.

The power input shaft 60 enters the differential casing through the head 21 as best shown in Figs. 2 and 3. On its splined end 61 is mounted the sun gear 65 which has bearings 66 for the differential driving pinion 67 which meshes with differential gear ring 35. The driving pinion 67 serves as part of a carrier for the planetary gears 70, these being mounted on stud shafts 71 and confined in pockets provided between the carrier discs 72 and 73, both of which are bolted to the pinion 67. The hub of the pinion has additional support from bearing 74 in a spider 76 which is bolted to the housing head 21 and against which housing head 20 seats with appropriate packing at 77.

The ring gear 80 meshes with the planetary gears 70 as best shown in Fig. 3 and Fig. 5 and floats upon the planetary gears, being sufficiently elongated axially to be movable alternatively into engagement with the fixed gear teeth 81 of the disc 82 or the gear teeth 83 formed on the disc 72 of the planetary gear carrier. Disc 82, which provides the fixed teeth 81, is screwed to the head 21 of the housing.

The shifting fork 85, which moves the ring gear 80 between the positions in which it is shown in Figs. 2 and 3 respectively, is mounted on a shifting rod 86 slidable through the bearing provided at 87 and peripherally grooved at 88 and 89 for selective reception of the spring pressed detent ball 90 mounted in closure 21. The pressure of the biasing spring 91 is adjustable by rotating the adjustable seat screw 92 inwardly and outwardly. A lock nut 93 holds the seat in its adjusted position.

It will be observed that while the ring gear 80 has substantial axial width, its dimensions are such that there is a neutral position between the position of Fig. 2 in which the ring gear is engaged with teeth 81 and the position of Fig. 3 in which the gear is engaged with teeth 83. Since the neutral position is not important to this particular transmisison, no detent groove is provided, and the shifting rod 86 extends through the neutral position when the ball 90 is engaged with the land 94 between grooves 88 and 89.

Operation is as follows:

Power being supplied through shaft 60 and the ring gear 80 being clutched to the stationary teeth 81 as in Fig. 2, the ring gear is held stationary and the planetary gears 70 are thereupon required, in the course of their rotation by sun gear 65, to progress about the interior of the stationary ring gear, the resulting rotation of the planetary gear carrier 72, 67 being communicated to the differential ring gear 35. Assuming that the differential lock clutch 46 is in the disengaged position in which it is illustrated in Fig. 3, the power is now communicated conventionally through the differential pinions and driven gears to the driven shafts 16 and 17 and the axle-driving line shafts 18 and 19, these being capable of differential action.

In the event of loss of traction at one axle or the other, the differential lock clutch 46 may have its teeth 47 engaged with the differential cage teeth 48, whereby the two output shafts are constrained to rotate in unison without differential action.

Where reduction in thte planetary transmission is not required, the shifting rod 86 is used to move the shift fork 85 from the position of Fig. 2 to locate the ring gear 80 in the alternative position in which it is shown in Fig. 3, wherein it is engaged with the teeth 83 of the planetary gear carrier 72, 67. This locks the carrier and the ring gear to preclude rotation of the planetary gears 70, whereupon the entire planetary transmission assembly is required to rotate with the sun gear in direct drive.

It will be apparent from the foregoing that an extremely compact combination of a reduction gear set with a differential has been achieved, the success in this regard being attributable in part to the general organization and, more particularly, to the use of the differential driving pinion 67 as a carrier for the planetary gears of the planetary transmission.

I claim:

1. A combined planetary transmission and differential comprising a housing having separable heads provided with bearings substantially at right angles to each other, aligned output shafts, one of which is provided with a bearing in one of said heads, an input shaft at right angles to the output shafts having a bearing in the other of said heads, differential gears mounted on the respective output shafts, a cage provided with planetary gears meshing with the differential gears, the cage being provided with hubs surrounding terminal portions of the output shafts, the housing having a relatively fixed web provided with a bearing for said cage, and one of said heads being provided with a bearing for said cage, a ring gear connected with the cage adjacent the last mentioned bearing, a pinion coaxial with the input shaft and meshing with the ring gear, a spider having a portion between the pinion and the cage provided with a bearing for the pinion, said spider being mounted on the head which provides a bearing for the input shaft, a sun gear on the input shaft, a set of transmission planetary gears meshing with the sun gear, stud shafts on which the planetary gears are mounted, annuli in which the ends of the stud shafts are socketed, the transmission planetary gears being confined between the annuli, means connecting the annuli unitarily with the pin, one of the annuli being provided with teeth, a third annulus fixed to the head which provides a bearing for the input shaft and provided with teeth, and a transmission ring gear meshing with the several transmission planetary gears and having teeth of sufficient axial length to accommodate movement of the ring gear axially into a first position of engagement with the teeth of the third annulus and a second position in which the teeth of the toothed annulus are connected with the pinion, and means for shifting the ring gear between said positions.

2. The device of claim 1 in further combination with clutch means for locking the differential cage to one of the output shafts.

3. The combination with a differential gear set including a driving gear and a pinion, of a housing for said set including a separable head detachably bolted to the housing, an input shaft extending through the head into the housing, a spider provided with pinion supporting bearing means and connected with said head, said spider including a portion extending between the pinion and the differential gear set and a planetary transmission within the housing between said head and said spider portion and comprising a sun gear mounted on said shaft, a set of planetary gears mounted on said pinion as a carrier and a ring gear with which the planetary gears mesh.

4. A device of the character described comprising a housing, an input power shaft leading thereto, a pair of output shafts leading therefrom, a differential gear set interconnecting the output shafts and comprising a driving ring gear, a driving pinion meshing with the ring gear and aligned with the input shaft, a sun gear mounted on the input shaft, planetary gears mounted on the pinion and for which the pinion constitutes a carrier, said planetary gears meshing with the sun gear, a fixed gear connected with the housing concentrically with the input shaft, a gear coaxial with said fixed gear mounted on the pinion, a transmission ring gear meshing with the planetary gears and supported thereon and having teeth of sufficient axial length to accommodate axial shifting movement of the ring gear into engagement selectively with the stationary gear and the coaxial gear mounted on the pinion, and means for shifting the transmission ring gear between positions of engagement as aforesaid, said input shaft extending into the median plane on the pinion, the pinion having a dished hub portion to receive the input shaft, said shaft being provided with bearings supporting the pinion and between the shaft and the housing, and a spider having bearing means in which the hub portion of the pinion is mounted.

References Cited in the file of this patent

UNITED STATES PATENTS

| | | |
|---|---|---|
| 2,225,720 | Snow | Dec. 24, 1940 |
| 2,331,684 | Henningsen | Oct. 12, 1943 |
| 2,737,064 | Stoeckicht | Mar. 6, 1956 |
| 2,742,684 | Rising et al. | Apr. 24, 1956 |

FOREIGN PATENTS

| | | |
|---|---|---|
| 8,203 | Great Britain | Apr. 7, 1904 |